(12) United States Patent
Maruyama et al.

(10) Patent No.: US 7,877,004 B2
(45) Date of Patent: Jan. 25, 2011

(54) IMAGING APPARATUS AND IMAGING METHOD

(75) Inventors: Atsushi Maruyama, Sagamihara (JP); Tetsuya Kokufu, Fussa (JP)

(73) Assignee: Olympus Imaging Corp., Tokyo (JP)

( * ) Notice: Subject to any disclaimer, the term of this patent is extended or adjusted under 35 U.S.C. 154(b) by 1009 days.

(21) Appl. No.: 11/709,003

(22) Filed: Feb. 21, 2007

(65) Prior Publication Data

US 2007/0206941 A1     Sep. 6, 2007

(30) Foreign Application Priority Data

Mar. 3, 2006   (JP)   ............................. 2006-058709
Mar. 3, 2006   (JP)   ............................. 2006-058710

(51) Int. Cl.
*G03B 17/00* (2006.01)

(52) U.S. Cl. .................... 396/52; 396/153; 396/213; 348/208.12

(58) Field of Classification Search ............ 396/153, 396/52–55, 95, 213; 348/208.4, 208.14, 348/208.6, 208.12
See application file for complete search history.

(56) References Cited

U.S. PATENT DOCUMENTS

| | | | |
|---|---|---|---|
| 6,570,620 B1 * | 5/2003 | Yoshimura et al. | 348/362 |
| 7,030,911 B1 * | 4/2006 | Kubo | 348/221.1 |
| 7,414,648 B2 * | 8/2008 | Imada | 348/208.12 |
| 7,525,590 B2 * | 4/2009 | Murata et al. | 348/352 |
| 7,565,068 B2 * | 7/2009 | Endo | 396/52 |
| 2002/0097324 A1 * | 7/2002 | Onuki | 348/208 |
| 2005/0062874 A1 | 3/2005 | Shiga et al. | |
| 2005/0128343 A1 * | 6/2005 | Murata et al. | 348/362 |
| 2005/0231628 A1 | 10/2005 | Kawaguchi et al. | |
| 2009/0153678 A1 * | 6/2009 | Nonaka et al. | 348/208.4 |

FOREIGN PATENT DOCUMENTS

| | | |
|---|---|---|
| CN | 1602623 | 3/2005 |
| JP | 07-123317 | 5/1995 |

OTHER PUBLICATIONS

Chinese Office Action for Chinese Patent Application No. 200710086130.1, mailed on Jul. 4, 2008 (5 pgs.) (with English Translation (6 pgs.)).

* cited by examiner

*Primary Examiner*—Christopher Mahoney
(74) *Attorney, Agent, or Firm*—Straub & Pokotylo; John C. Pokotylo

(57) ABSTRACT

An imaging apparatus is disclosed which analyzes image data of a subject acquired by an image pickup device to select an appropriate combination of exposure time, aperture, and exposure sensitivity upon shooting in order to perform exposure control. As an example of image data analysis methods, there is shown a method of detecting the movement of a characteristic point in an image, or a method of detecting luminance variations in a specific block or area in the image to detect the subject movement. As another exemplary method, a face of the subject is detected. The present invention can also be combined with a shake reduction mode.

6 Claims, 13 Drawing Sheets

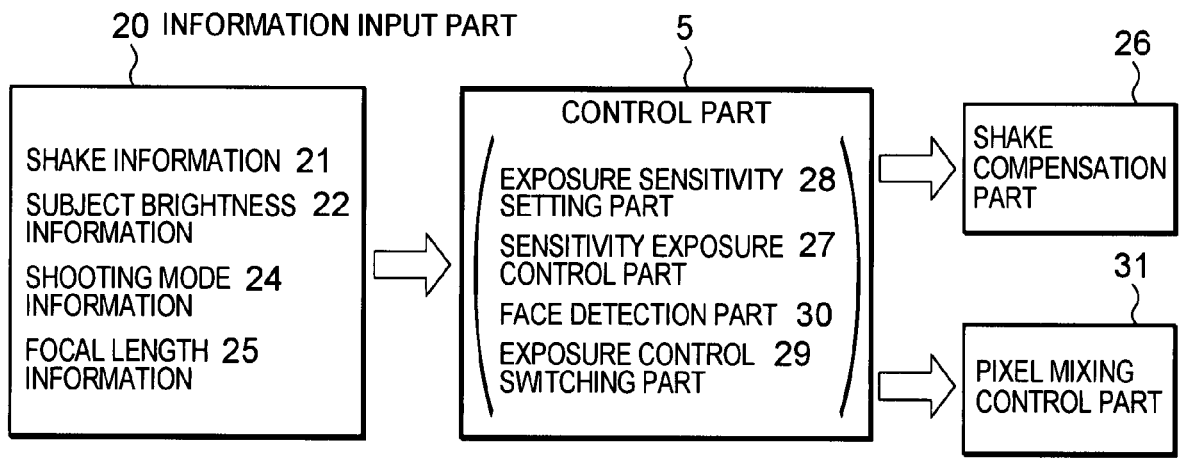

IMAGING APPARATUS AND IMAGING METHOD

CROSS-REFERENCE TO RELATED APPLICATION

This application is based upon and claims the benefit of priority from prior Japanese Patent Application Nos. 2006-058709, filed on Mar. 3, 2006 and 2006-058710, filed on Mar. 3, 2006, the entire contents of which are incorporated herein by reference.

BACKGROUND OF THE INVENTION

1. Field of the Invention

The present invention relates to an imaging apparatus such as a digital camera or a video camcorder provided with a function for reducing the effects of camera shakes or blurry subjects.

2. Description of the Related Art

Recently, digital cameras with anti-shake capability to optically correct camera shake by shifting a photographing lens or an image pickup device have been commercially available. On the other hand, digital cameras with electronic anti-shake capability to store image information and electronically correct the stored image information have also been commercially available.

Japanese Patent Application Laid-Open No. 7-123317 teaches a method of switching between an optical anti-shake function capable of optical shake compensation and an electronic anti-shake function capable of electronic shake correction in a shake compensation device.

BRIEF SUMMARY OF THE INVENTION

The imaging apparatus of the present invention is to analyze image data of a subject acquired by an image pickup device to select a proper combination from among a plurality of combinations of exposure time, aperture value, and exposure sensitivity upon shooting in order to control exposure.

As one of methods of analyzing image data, a method of detecting the speed of movement of the subject can be employed. In this case, there can be considered, for example, a method of detecting the movement of characteristic points in the image, or a method of detecting luminance variations in specific blocks (or areas) in the image.

As another method of analyzing image data, a method of detecting the face of a subject can also be employed. In this case, for example, if the face area is large, the method tends to select a combination of exposure time, aperture value, and exposure sensitivity suited to shooing with higher image quality.

The imaging apparatus of the present invention can be configured to incorporate a shake reduction mode for performing an anti-shake function as described in the above prior-art techniques. In this case, the imaging apparatus can select different combinations of exposure time, aperture value, and exposure sensitivity between the shake reduction mode and any mode other than the shake reduction mode.

Upon selecting a combination of exposure time, aperture value, and exposure sensitivity, the brightness of the subject can be considered.

The selection of the combination of exposure time, aperture value, and exposure sensitivity can depend on the shooting mode currently selected.

Further, the selection of the combination of exposure time, aperture value, and exposure sensitivity can be combined with pixel mixing. For example, when high image quality is determined unnecessary as a result of face detection and/or from current settings, pixel mixing can be performed to increase the effective sensitivity of the image pickup device. In such a case that the effective sensitivity is increased, a combination of exposure time and aperture value suited to the increased sensitivity is selected.

The present invention can also be understood as the invention of an imaging method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 12 is a diagram showing an example of a flow of anti-shake processing based on information captured in an information input part of the imaging apparatus of FIG. 11;

FIG. 13 is a diagram showing an example of a mosaic array of RGB pixels of original image data acquired by an image pickup device in the imaging apparatus of FIG. 11;

FIG. 14 is a diagram showing one pixel upon pixel mixing of the original image data in FIG. 13;

DETAILED DESCRIPTION OF THE PREFERRED EMBODIMENT

Preferred embodiments of the invention are described below with reference to the accompanying drawings.

In a first embodiment of the present invention, when an imaging apparatus is in a shake reduction mode, information obtained from image data acquired by an image pickup device is analyzed to detect the moving speed of a subject in order to select a relationship between the aperture value and the shutter speed (an exposure program) according to the detected moving speed.

Figure 1:
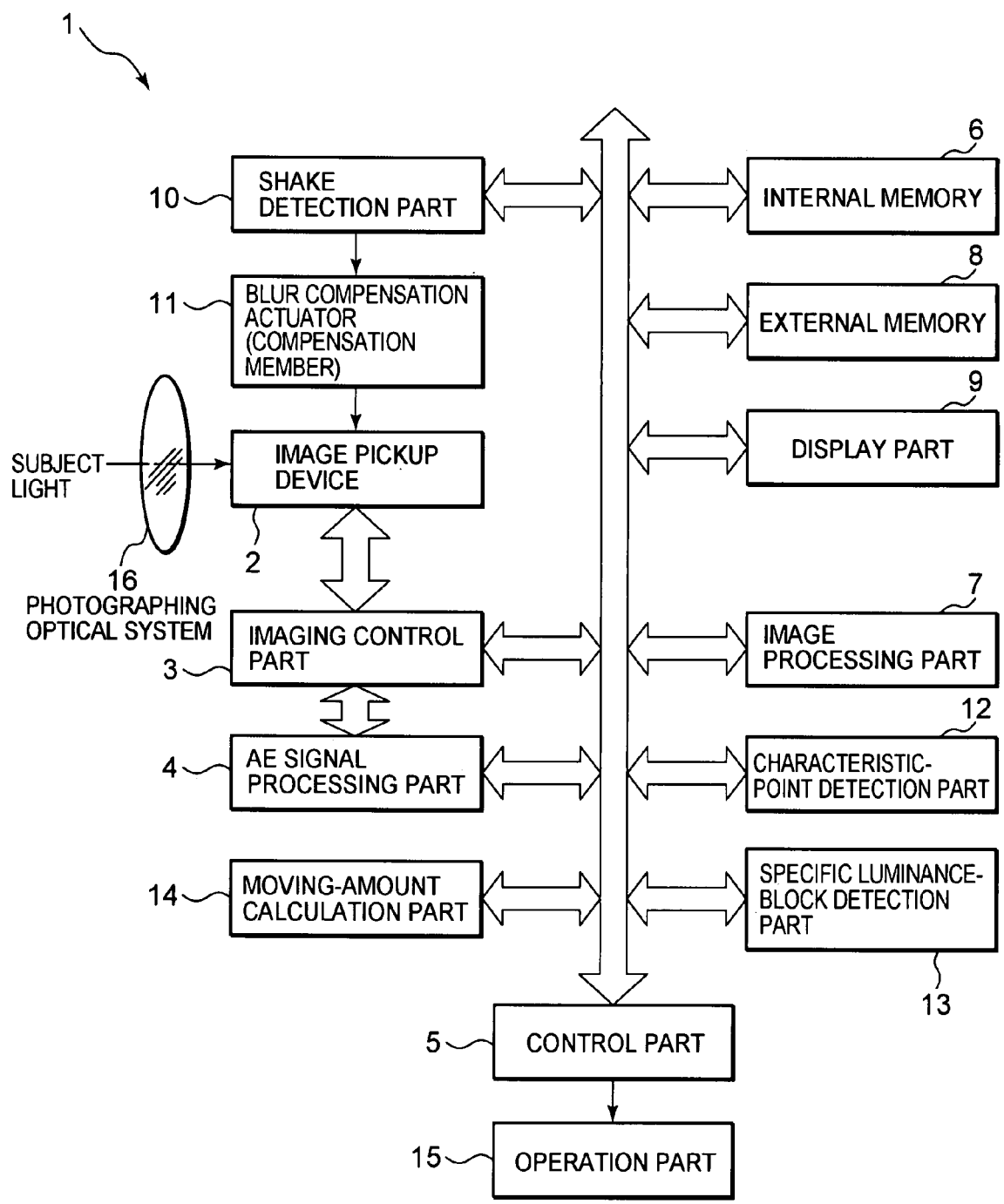
FIG. 1 is a block diagram showing the main blocks of an imaging apparatus with an anti-shake function according to a first embodiment of the present invention.

As shown in FIG. 1, an imaging apparatus with an anti-shake function (hereinafter simply referred to as "imaging apparatus") 1 according to the first embodiment of the present invention includes a photographing optical system 16, an image pickup device 2, an imaging control part 3, an AE signal processing part 4, an internal memory 6, an external memory 8, a display part 9, an image processing part 7, a characteristic-point detection part 12, a specific luminance-block detection part 13, a moving-amount calculation part 14, a shake detection part 10, a blur compensation actuator 11, a control part 5, and an operation part 15.

The image pickup device 2 photoelectrically converts a subject image captured through the photographing optical system 16. The imaging control part 3 is an imaging part to control the image pickup device 2 and process a captured image signal output from the image pickup device 2. The AE signal processing part 4 is a photometric part to determine subject brightness information 22 (FIG. 2) from image data generated from the captured image signal of the image pickup device 2. The internal memory 6 temporarily stores the image data. The external memory 8 is a memory card or the like removably loaded into the imaging apparatus 1 to record the image data. The display part 9 consists of an LCD and the like for accepting the image data to display an image. The image processing part 7 generates image data of the subject based on the captured image signal.

The characteristic-point detection part 12 is a movement detection part/information input part to detect characteristic points of the subject. For example, if the subject is a person, the characteristic-point detection part 12 detects the positions of eyes, nose, and mouth, typically used in face recognition processing, as the characteristic points (features) of the subject based on the image data of the subject image stored in the internal memory 6 at every predetermined time interval. This characteristic-point position information is captured into the moving-amount calculation part 14. If the positions of the characteristic points have changed by a predetermined amount or more during a predetermined time period, the moving-amount calculation part 14 recognizes subject blur (subject movement) and calculates the moving speed vectors as subject movement information 23. Note that, since the detected subject movement information 23 is affected by the focal length of the photographing optical system 16 at the time of shooting and the output of the shake detection part 10 indicating shake or panning action of the imaging apparatus, these kinds of information are also added to determine the magnitude of the movement. The characteristic-point detection part 12 can be implemented, for example, as an independent circuit element or as a specific program module executed by the control part 5.

The specific luminance-block detection part 13 is also a movement detection part/information input part to detect luminance variations in one or more specific blocks of the subject image. The specific luminance-block detection part 13 is incorporated in the AE signal processing part 4. The specific luminance-block detection part 13 divides the image data of the subject image stored in the internal memory 6 into a certain number of blocks to integrate luminance components in each block or converts data integrated for each color component in each block into luminance data, thus obtaining a luminance value in the each block. The luminance value in the each block is detected at every constant time interval, and if the luminance value in each block has varied by a predetermined value or more, it is determined that the subject has moved. As mentioned above, the luminance value in each block is detected at constant time intervals, and captured into the moving-amount calculation part 14 to calculate the moving speed (the amount of movement) of the subject as the subject movement information 23. Note that, since the detected subject movement information 23 is affected by the focal length of the photographing optical system 16 at the time of shooting and the output of the shake detection part 10 indicating shake or panning action of the imaging apparatus, these kinds of information are also added to determine the magnitude of the movement. The specific luminance-block detection part 13 can be implemented, for example, as an independent circuit element or as a specific program module executed by the control part 5.

The moving-amount calculation part 14 is a movement detection part to calculate and extract the subject movement information 23 (FIG. 2) based on the output of the characteristic-point detection part 12 or the specific luminance-block detection part 13. In the embodiment, the subject movement information 23 is calculated using either the output of the characteristic-point detection part 12 or the output of the specific luminance-block detection part 13 in the manner as mentioned above. The moving-amount calculation part 14 can be implemented, for example, as an independent circuit element or as a specific program module executed by the control part 5.

The shake detection part 10 is a shake detection part/information input part consisting of an attitude sensor and the like to detect shake (movement) of the imaging apparatus and output shake information 21 on the camera (imaging apparatus).

The blur compensation actuator 11 is a compensation member to drive the image pickup device 2 in order to reduce the effects of the shake of the imaging apparatus. The driving of the blur compensation actuator 11 is controlled by a shake compensation part 26 of the control part 5 to be described later based on the output of the shake detection part 10 in the shake reduction mode to shift a relative subject image position on the imaging surface of the image pickup device 2 in a direction to compensate for the shake.

The control part 5 is an imaging control part connected with the above-mentioned control components shown in FIG. 1 through a bus line to control the entire operation of the imaging apparatus 1. The control part can be implemented, for example, by a CPU.

The operation part 15 is an information input part consisting of a mode setting switch for setting a shooting mode and inputting shooting mode information 24 including the shake reduction mode on each of the shooting modes, and operating switches such as a release switch as a shooting start instruction part to instruct the start of shooting, etc.

Figure 2:
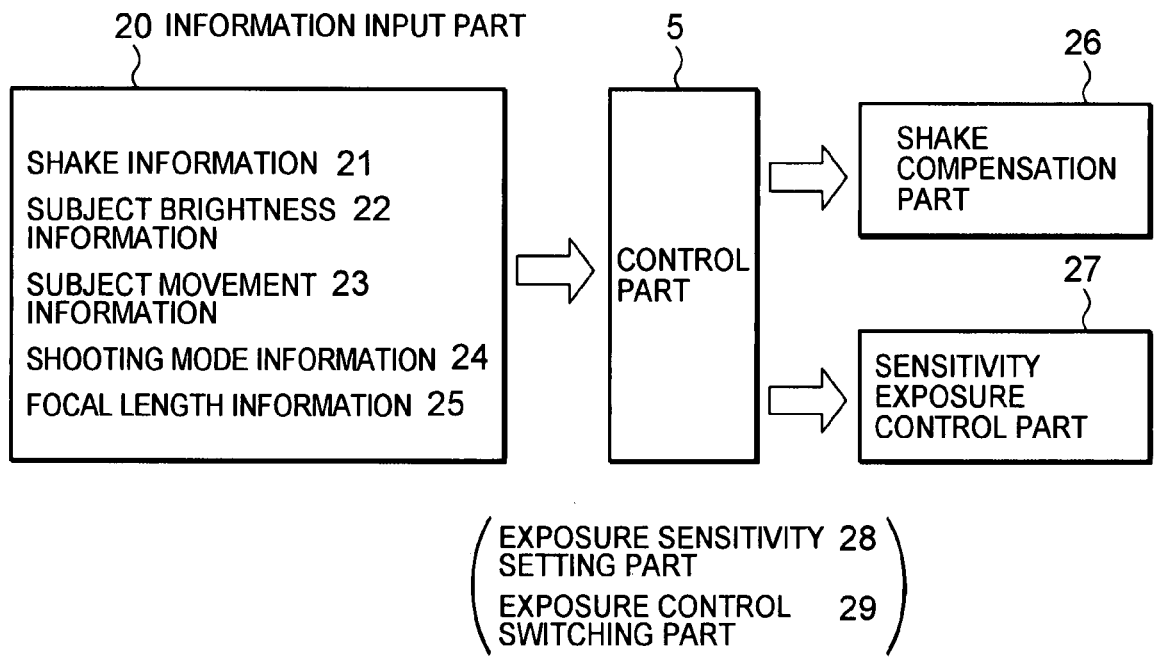
FIG. 2 is a diagram showing an example of a flow of anti-shake processing based on information captured in an information input part of the imaging apparatus of FIG. 1.

As shown in FIG. 2, the above-mentioned information, namely the shake information 21 detected by the shake detection part 10, the subject brightness information 22 detected from the captured image signal of the image pickup device 2, the subject movement information 23 calculated at the moving-amount calculation part 14, and the shooting mode information 24 including the setting of the shake reduction mode input and set via the operation part 15, and focal length information 25 on the photographing optical system 16 are captured into an information input part 20 as an input part. The information input part 20 can be implemented, for example, as a data bus. These kinds of camera information captured in the information input part 20 are input into the control part 5.

The control part 5 incorporates an exposure sensitivity setting part 28, a sensitivity exposure control part (typically including normal-, intermediate-, and high-sensitivity exposure control parts) 27, an exposure control switching part 29, and the shake compensation part 26. These parts can be implemented, for example, as program modules.

The exposure sensitivity setting part 28 is to set the exposure sensitivity (ISO sensitivity) of the image pickup device 2. The sensitivity exposure control part 27 is to perform exposure control (normal exposure control, intermediate-sensitivity exposure control, and high-sensitivity exposure control) based on plural kinds of exposure control program line diagrams (FIGS. 4 to 7). The exposure control switching part 29 is to switch among the normal exposure control, the intermediate-sensitivity exposure control, and the high-sensitivity exposure control. The shake compensation part 26 is to control the driving of the blur compensation actuator 11 as the compensation member in the shake reduction mode.

The following describes shake control and exposure control operations of the imaging apparatus 1 of the embodiment having the above-mentioned structure at the time of shooting with reference to FIGS. 2 to 7.

As shown in FIG. 2, in the imaging apparatus 1, the above-mentioned shake information 21, subject brightness information 22, subject movement information 23, shooting mode information 24, and focal length information 25 input from the information input part 20 are captured under the control of the control part 5 in both the shake reduction mode and non-shake reduction modes. Particularly in the shake reduction mode, shake reduction processing by the shake compensation part 26 and/or exposure control processing by the sensitivity exposure control part 27 are selectively performed under the control of the exposure control switching part 29.

For example, if the shake reduction mode is not set (i.e., in any one of non-shake reduction modes), control of driving of the blur compensation actuator 11 is not performed through the shake compensation part 26. Then, using the focal length information on the optical system 16, a standard exposure control program line diagram for non-shake reduction modes (standard P line diagram) shown in FIG. 4 is adopted for the wide-angle end or telephoto end to perform exposure control in order to decide the shutter speed (sec.) and the aperture value under a given shooting sensitivity.

Figure 4:
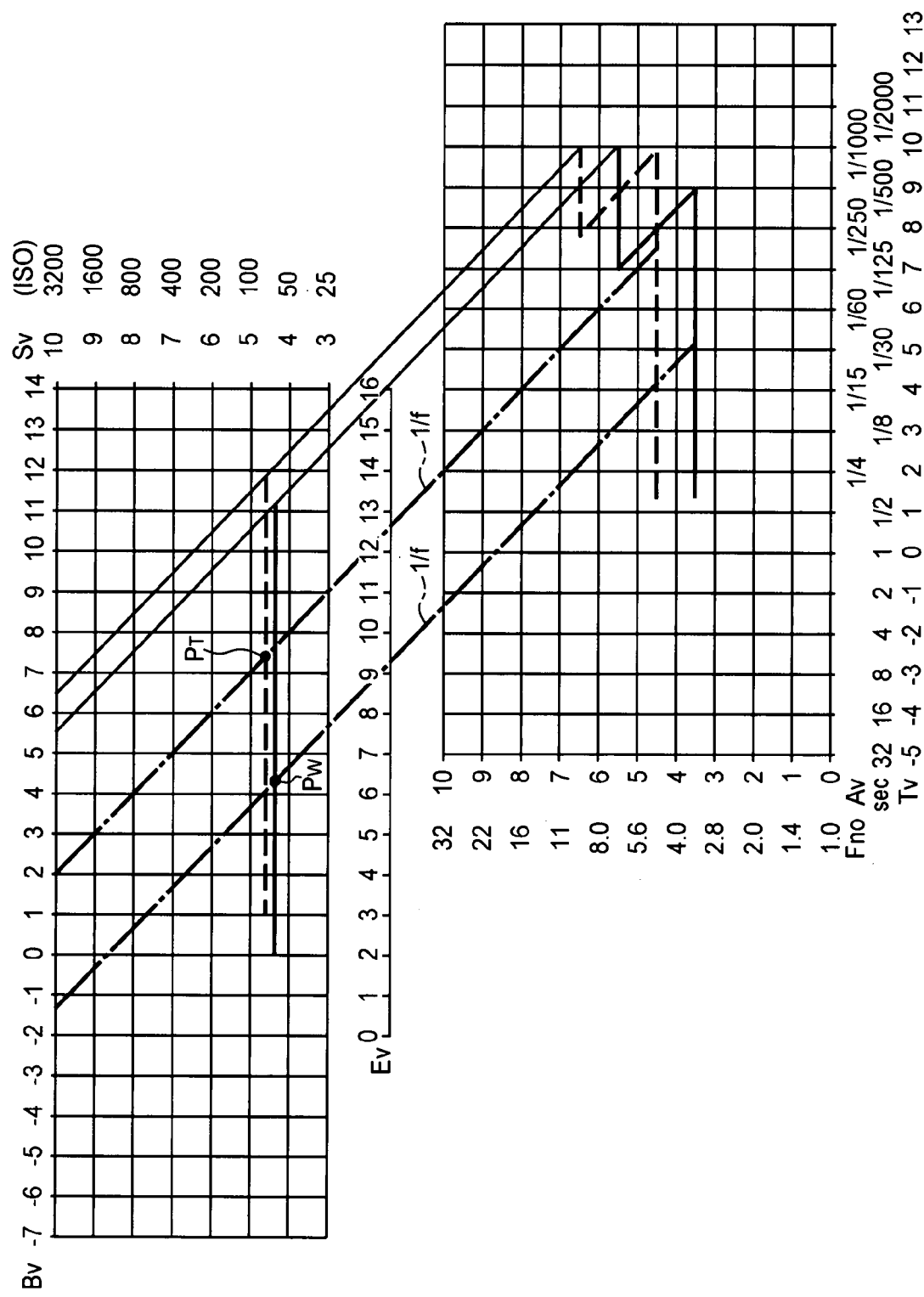
FIG. 4 shows a standard exposure control program line diagram for wide-angle/telephoto states of the imaging apparatus of FIG. 1 in non-shake reduction modes.

In the standard exposure control program line diagram (standard P line diagram) of FIG. 4, shooting sensitivity values Sv with relatively low exposure sensitivities are set for a wide-angle state (indicated by a solid line) and a telephoto state (indicated by a broken line), respectively. If the flash mode is set in an auto flash mode, a fill-in flash operation is performed, in which the flash fires when the shutter speed is at a shake limiting point PW for the wide-angle end or at a shake limiting point PT for the telephoto end, respectively. The shutter speed at the shake limiting point PW or PT is expressed as a value given by the inverse number of the focal length (1/f). Further, when the shutter speed is on a low speed side, the aperture F No. shifts to the largest aperture side.

Figure 5:
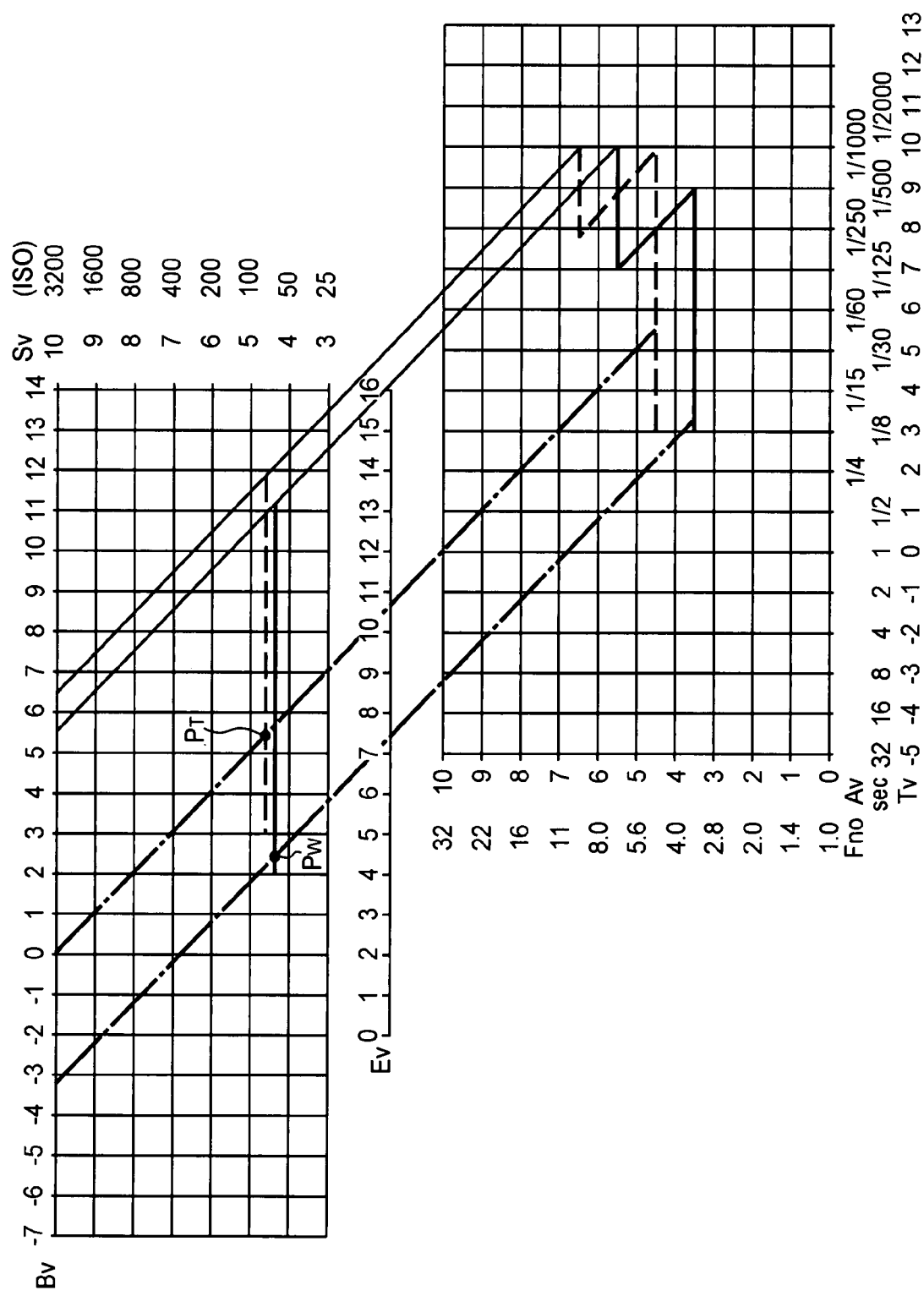
FIG. 5 shows a normal-sensitivity exposure control program line diagram for wide-angle/telephoto states of the imaging apparatus of FIG. 1 in the shake reduction mode.
Figure 6:
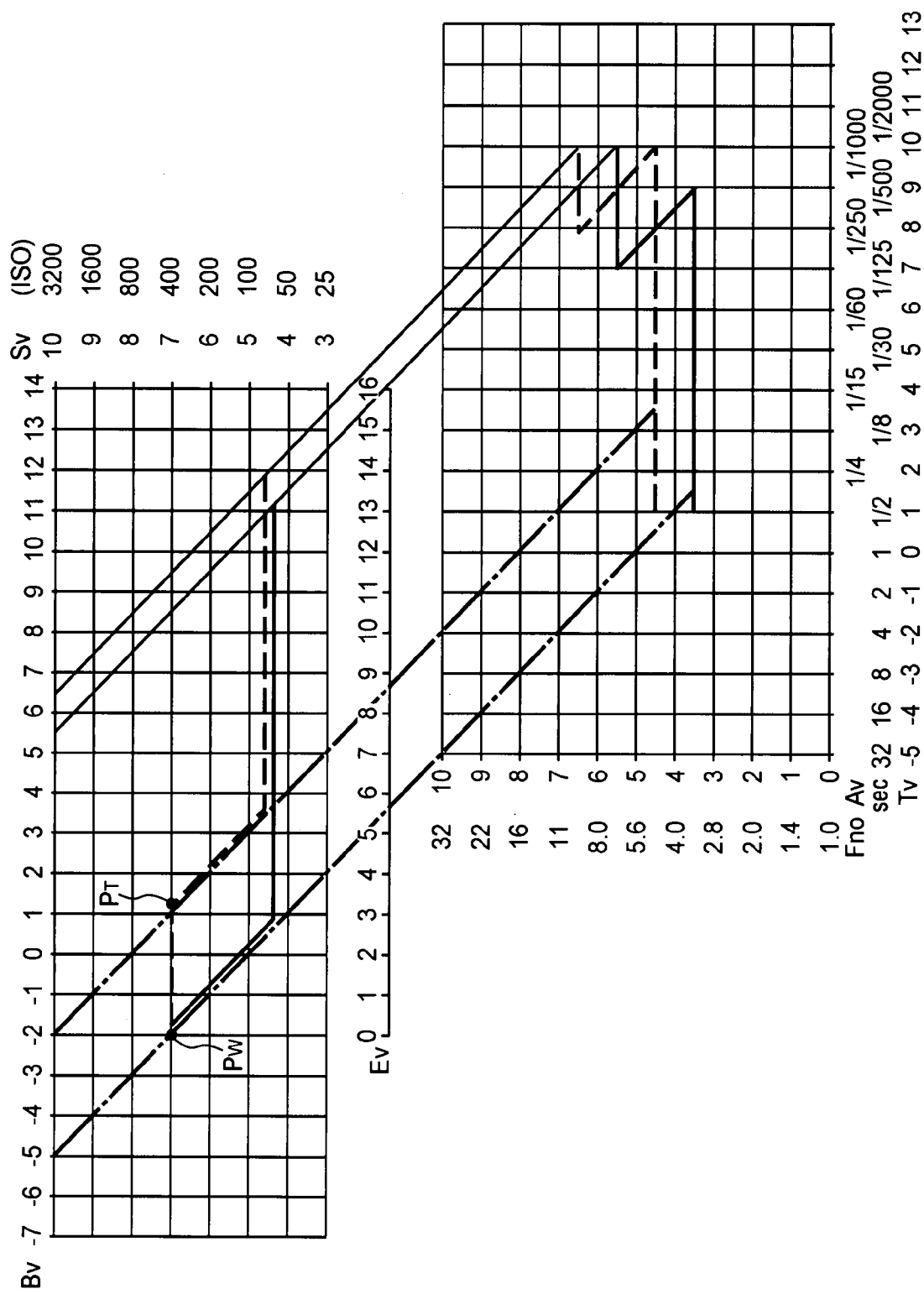
FIG. 6 shows an intermediate-sensitivity exposure control program line diagram for wide-angle/telephoto states of the imaging apparatus of FIG. 1 in the shake reduction mode.
Figure 7:
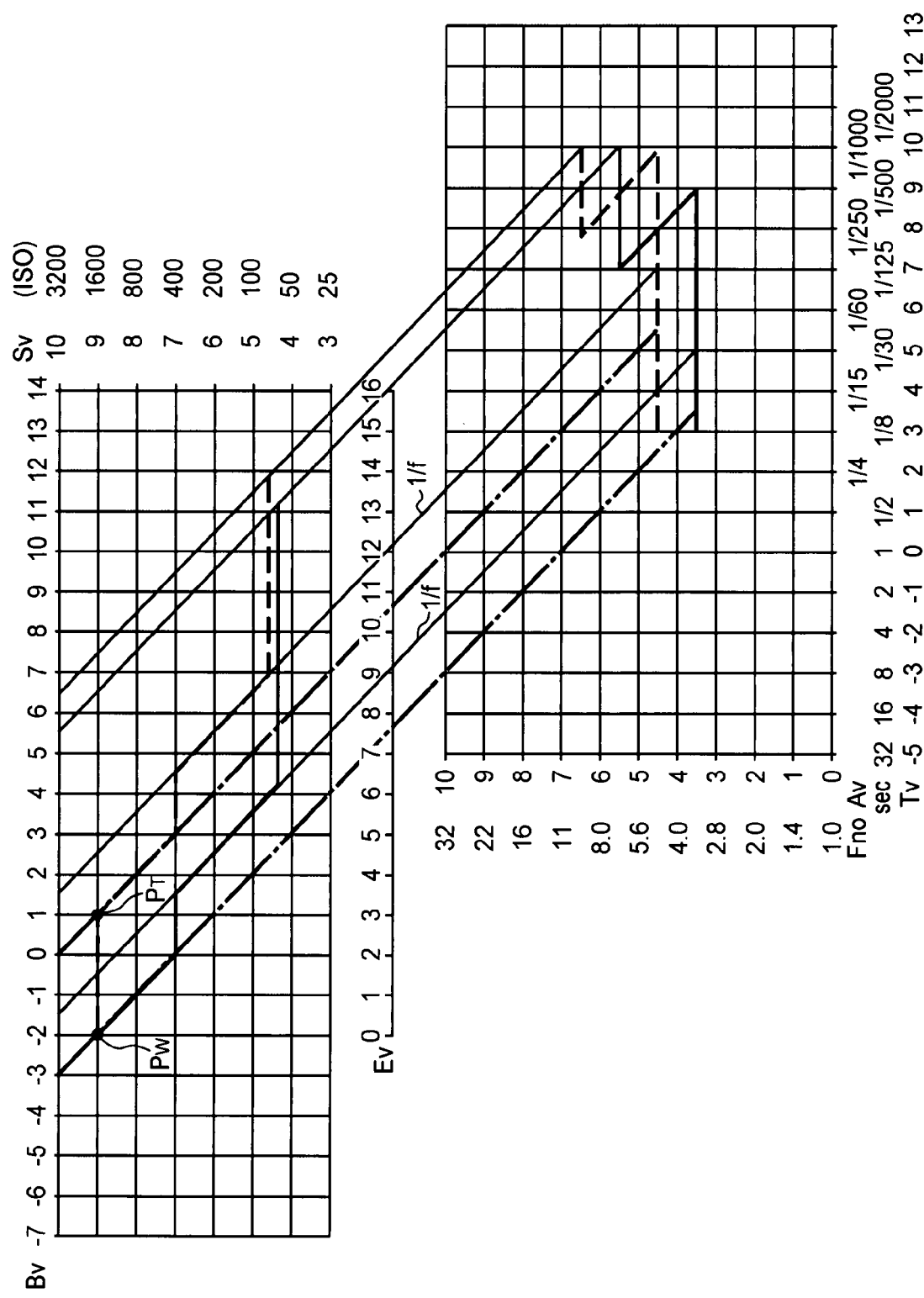
FIG. 7 shows a high-sensitivity exposure control program line diagram for wide-angle/telephoto states of the imaging apparatus of FIG. 1 in the shake reduction mode.

On the other hand, if the shake reduction mode is set, the driving of the blur compensation actuator 11 is controlled through the shake compensation part 26 based on the shake information 21. Further, based on the subject movement information 23, any one of program line diagrams for normal exposure control, intermediate sensitivity exposure control, and high sensitivity exposure control, respectively shown in FIGS. 5 to 7, is selected by the sensitivity exposure control part 27. Then, according to the selected exposure control program, the shooting sensitivity is changed as necessary, and exposure control to decide the shutter speed and the aperture value is performed.

Figure 3:
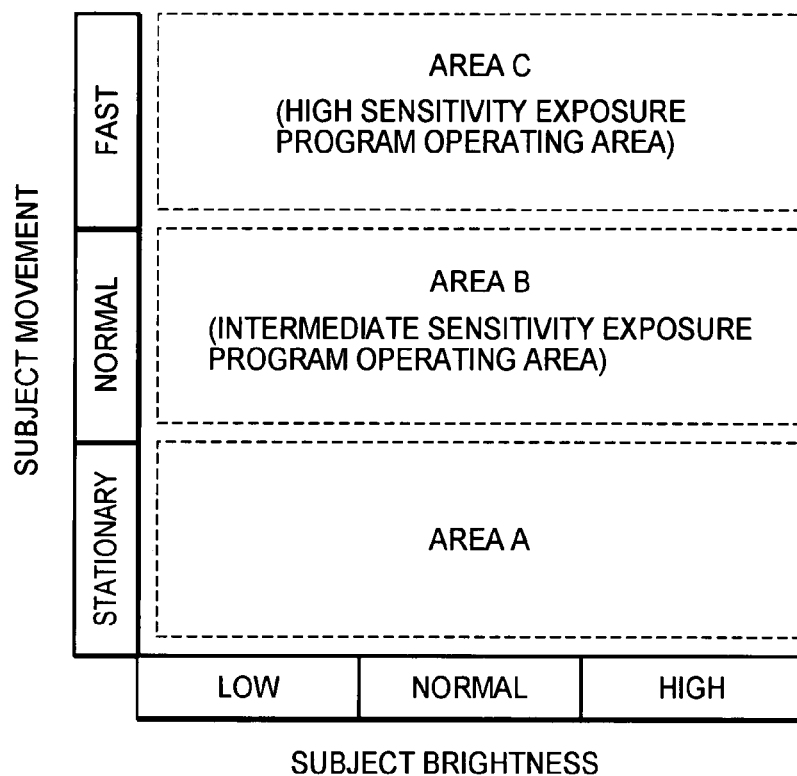
FIG. 3 is a diagram showing exposure control areas selected according to the subject brightness/subject movement when a shake reduction mode is set in the imaging apparatus of FIG. 1.

To be more specific, as shown in FIG. 3, when the shake reduction mode is set, the control part 5 adopts three areas for three states of the subject movement information 23, namely stationary, normal, and fast moving states, respectively, regardless of whether the brightness of the subject is low, normal, or high. Area A is a normal sensitivity exposure program operating area, area B is an intermediate sensitivity exposure program operating area, and area C is a high sensitivity exposure program operating area. In case of area A, a normal-sensitivity exposure control program line diagram (P line diagram A) shown in FIG. 5 is adopted for both the wide-angle state (indicated by the solid line) and the telephoto state (indicated by the broken line) of the photographing optical system 16. Similarly, in case of area B, an intermediate-sensitivity exposure control program line diagram (P line diagram B) shown in FIG. 6 is adopted, while in case of area C, a high-sensitivity exposure control program line diagram (P line diagram C) shown in FIG. 7 is adopted.

In the normal-sensitivity exposure control program line diagram for the shake reduction mode shown in FIG. 5, predetermined and relatively low shooting sensitivity values Sv are set for both the wide-angle state (indicated by the solid line) and the telephoto state (indicated by the broken line) like in FIG. 4. However, because the shake compensation is performed in this case, the shutter speed at the shake limiting point PW for the wide-angle end or the shake limiting point PT for the telephoto end, at which flash fires, shifts to a lower speed side than that in the line diagram of FIG. 4. Further, compared with the line diagram of FIG. 4, the longest shutter speed is limited from ½ to ⅛. Thus, since the longest shutter speed is limited to a faster speed, those familiar with camera handling can take pictures with reduced effects of camera shake in the entire luminance range. This shooting situation is in the range of stationary subject shooting conditions in FIG. 3, so that both camera shake and subject blur can be reduced. Further, since the shooting sensitivity is maintained low, random noise or fixed-pattern noise caused upon imaging is not amplified, and hence image quality is not degraded.

In the intermediate-sensitivity exposure control program line diagram for the shake reduction mode shown in FIG. 6, relatively low shooting sensitivity values Sv are set in a high subject brightness range for both the wide-angle state (indicated by the solid line) and the telephoto state (indicated by the broken line). However, in this case, in order to maintain the shutter speeds at the shake limiting point PW for the wide-angle end and the shake limiting point PT for the telephoto end, respectively, the shooting sensitivity is shifted up to ISO 400 on the intermediate sensitivity side. As for the subject movement, since it is in the normal state as shown in FIG. 3, both camera shake and subject blur can be reduced in a like manner. Thus, the occurrence of subject blur is suppressed by slightly increasing the shooting sensitivity to such an extent to minimize the degradation of image quality.

In the high-sensitivity exposure control program line diagram for the shake reduction mode shown in FIG. 7, predetermined and relatively low shooting sensitivity values Sv are set in a high subject brightness range for both the wide-angle state (indicated by the solid line) and the telephoto state (indicated by the broken line). However, in this case, the shooting sensitivity starts increasing from a brighter situation in a range of shutter speeds slower than the value given by the inverse number of the focal length (1/f). This makes it possible to reduce subject blur even if the subject is a fast moving subject shown in FIG. 3 (for example, such as a sports car traveling at high speed). Further, as the brightness of the subject becomes lower, the shooting sensitivity increases up to ISO 1600 in order to suppress the occurrence of subject blur while extending the photographable luminance range to cover a lower luminance range. Since the increase in shooting sensitivity is limited to such a range not to interfere with reduction in subject blur, the degradation of image quality due to noise generation resulting from the increase in shooting sensitivity is minimized.

Figure 8:
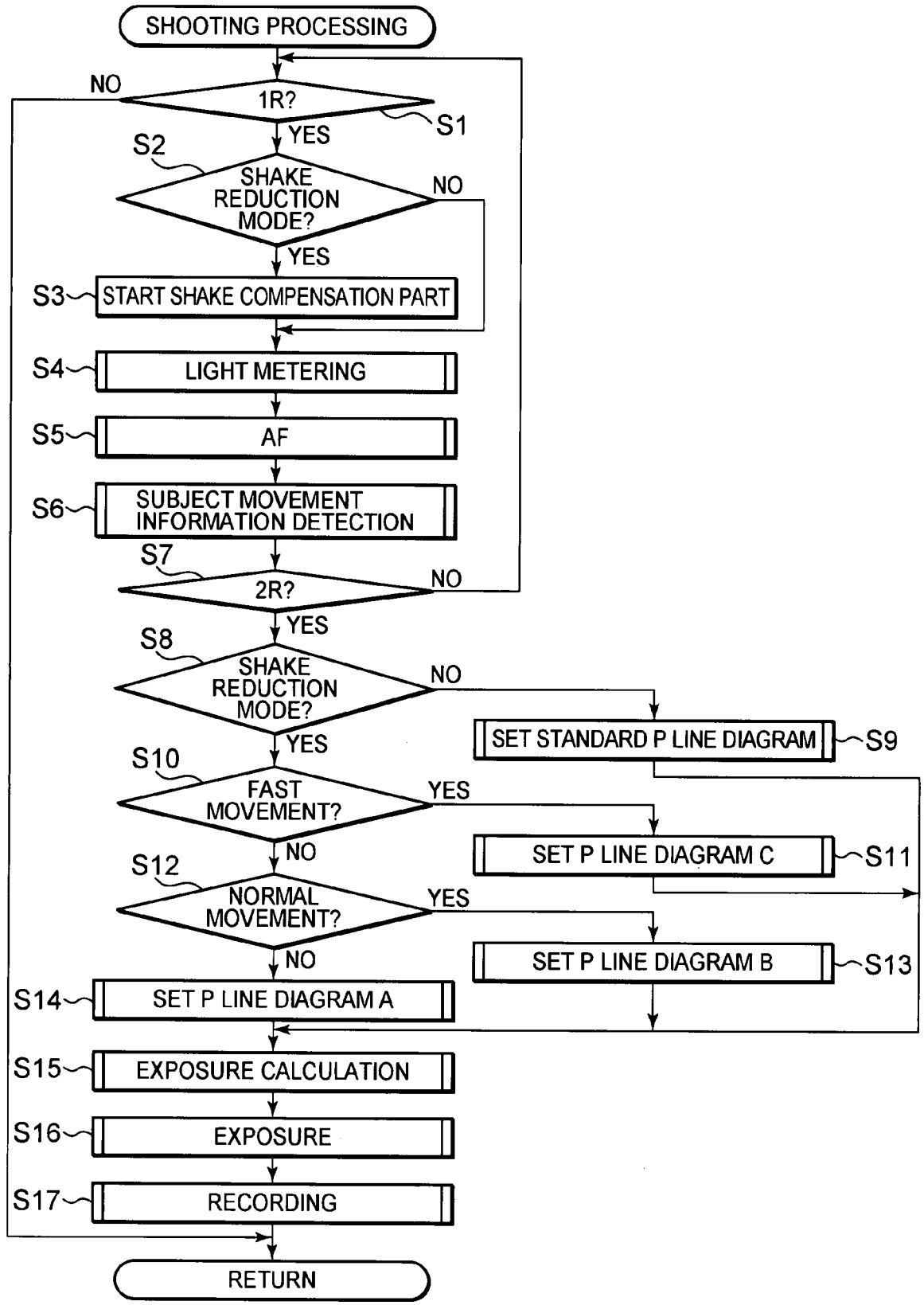
FIG. 8 is a flowchart of shooting processing in the imaging apparatus of FIG. 1.

Shooting processing of the imaging apparatus 1 including the above-mentioned shake compensation and exposure control will be described below with reference to a flowchart of FIG. 8.

When the shooting processing is started, the following steps are executed under the control of the control part 5. First, in step S1, a first-step release (1R) on signal is checked. If the on signal is detected, the procedure goes to step S2 to check if the shake reduction mode is set. If it is set, the amount of shake (shake information 21) detected at the shake detection part 10 is input into the control part 5 in sequence to start the operation of the shake compensation part 26 in step S3 in order to control the driving of the blur compensation actuator 11 in such a direction to compensate for the shake.

Then, in step S4, an image signal captured by the image pickup device 2 is converted at the imaging control part 3 to generate an AE signal (block-specific luminance information) at the AE signal processing part 4 from image data written in the internal memory 6 and write the AE signal to the internal memory 6. In step S5, a focus lens built in the photographing optical system 16 is driven using a known contrast technique to a position at which the subject is focused, thus performing AF. In step S6, a subroutine that performs detection processing for subject movement information is called based on the AE signal (block-specific luminance information) to determine the subject movement information 23. In the detection processing for subject movement information in step S6, instead of detecting the subject movement based on the block-specific luminance information, the subject movement can be detected based on the output signal of the above-mentioned characteristic-point detection part 12 by detecting, for example, the movement of the characteristic points (features) using face recognition for recognizing the face of a person as the subject.

In step S7, a second-step release (2R) on signal is checked. If the on signal is detected, the procedure goes to step S8, while if it is not detected, the procedure returns to step S1.

In step S8, it is checked again if the shake reduction mode is set. If it is not set, the procedure goes to step S9, while it is set, the procedure goes to step S10.

In step S9, the standard exposure control program line diagram (standard P line diagram) shown in FIG. 4 is set as the exposure control program line diagram, and the procedure jumps to step S15. On the other hand, in steps S10 and S12, it is determined whether the subject movement information 23 obtained in step S6 indicates a speed higher than a predetermined value, a normal speed, or a slow (or stationary). If it is higher, the procedure goes to step S11. If it is the normal speed, the procedure goes to step S13. If it is slow (or stationary), the procedure goes to step S14.

In step S11, the high-sensitivity exposure control program line diagram (P line diagram C) shown in FIG. 7 is set as the exposure control program line diagram, and the procedure jumps to step S15. In step S13, the intermediate-sensitivity exposure control program line diagram (P line diagram B) shown in FIG. 6 is set as the exposure control program line diagram, and the procedure jumps to step S15. In step S14, normal-sensitivity exposure control program line diagram (P line diagram A) shown in FIG. 5 is set as the exposure control program line diagram, and the procedure goes to step S15.

In step S15, the shutter speed and the aperture value are set based on the set exposure control program line diagram, and in step S16, the image pickup device 2 is exposed according to the set shutter speed and the aperture value.

In step S17, a picture signal generated based on an image signal captured by the image pickup device 2 is once recorded in the internal memory 6, converted into a desired format (JPEG or TIFF), and recorded again in the internal memory 6. The control part 5 stores the picture signal recorded in the internal memory 6 into the external memory 8, thus completing this routine.

According to the imaging apparatus 1 of the embodiment, based on the shake information 21 and the subject brightness information 22 or the subject movement information 23, either or both of the shake compensation part 26 for correcting relative position displacement of the subject image on the image pickup device 2 due to the shake of the imaging apparatus and the exposure control part 27 for correcting the sensitivity of the image pickup device 2 to a higher sensitivity side are selectively operated as appropriate. This can reduce or eliminate the effects of the shake of the imaging apparatus and subject blur while suppressing the degradation of image quality across all shot images by performing high sensitivity exposure shooting on an as-needed basis.

In the imaging apparatus 1, the relative position displacement of the subject image on the image pickup device 2 due to the shake of the imaging apparatus is corrected by the shake compensation part 26, but the relative position displacement on the image pickup device 2 due to the subject movement can also be corrected by the shake compensation part 26 through the blur compensation actuator (compensation member) 11 according to the detected subject movement information 23.

Figure 9:
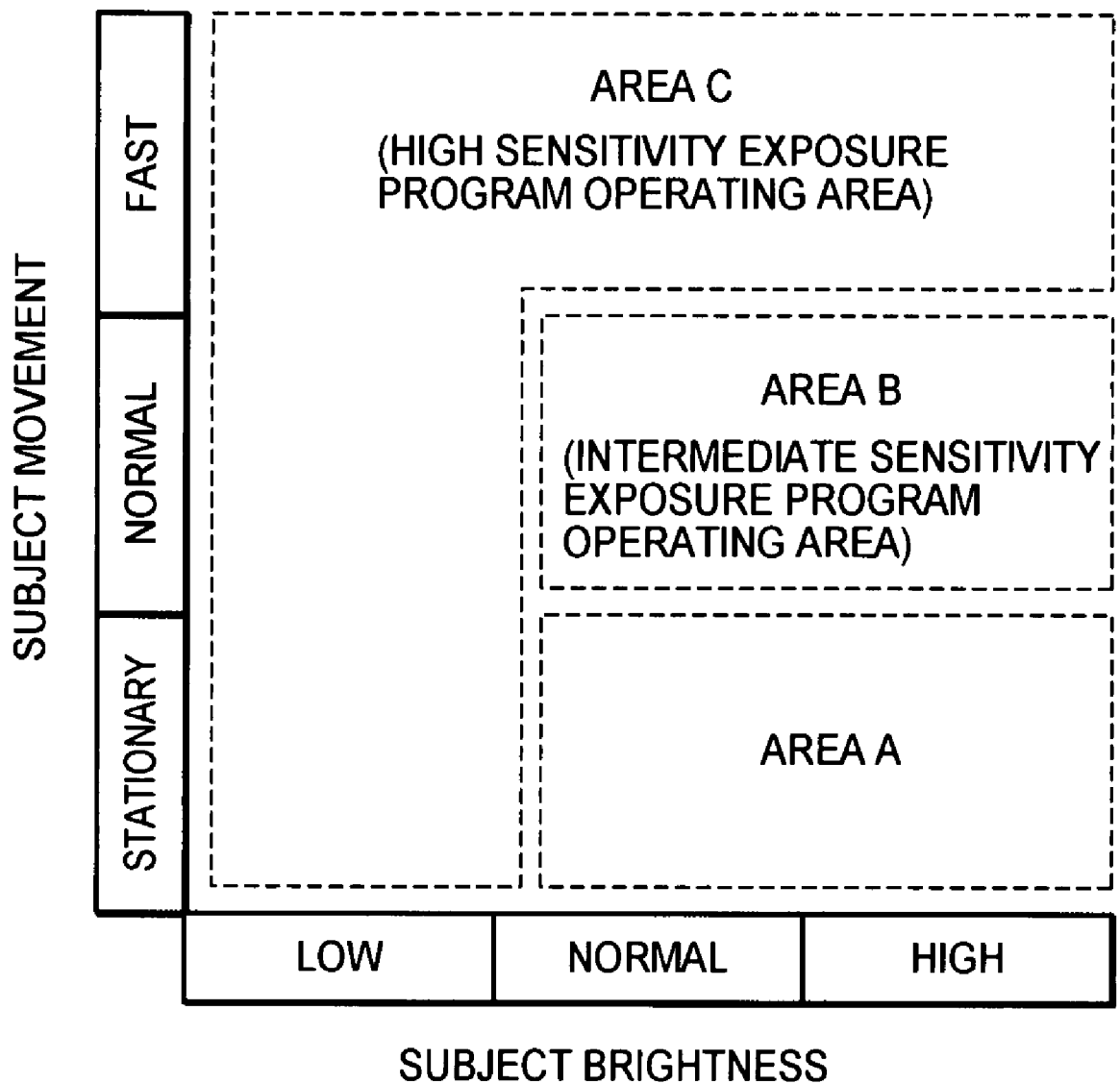
FIG. 9 is a diagram showing exposure control areas selected according to the subject brightness/subject movement when the shake reduction mode is set in an imaging apparatus according to a second embodiment of the present invention.
Figure 10:
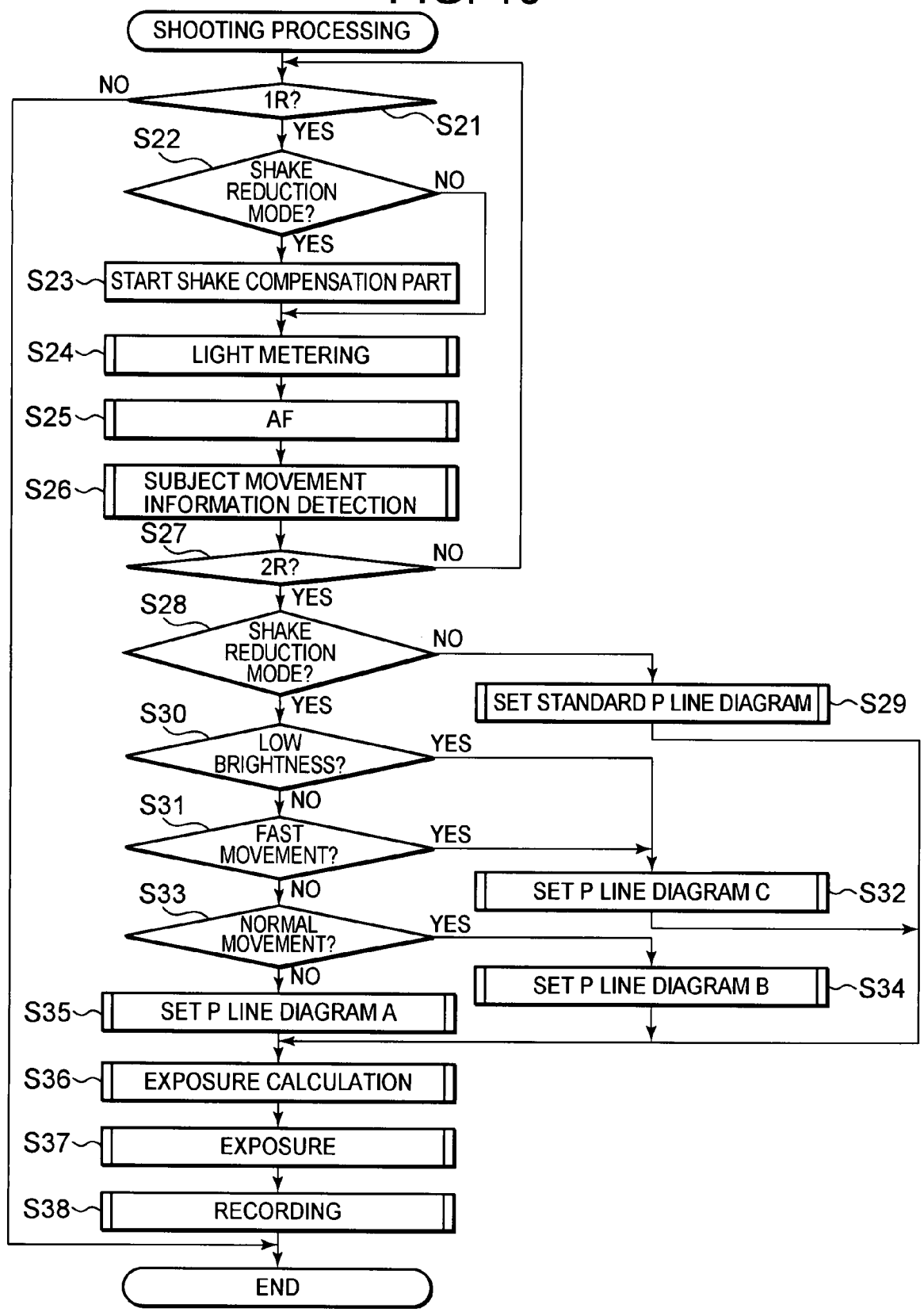
FIG. 10 is a flowchart of shooting processing in the imaging apparatus of FIG. 9.

Referring next to FIGS. 9 and 10, an imaging apparatus according to a second embodiment of the present invention will be described.

In the aforementioned first embodiment, the information obtained from image data acquired by the image pickup device is analyzed to detect the moving speed of a subject in order to select a relationship (an exposure program) between the aperture value and the shutter speed according to the detected moving speed. In contrast, the second embodiment is to take the brightness of the subject into consideration in addition to the moving speed.

FIG. 9 is a diagram showing exposure control areas selected according to the subject brightness/subject movement when the shake reduction mode is set in the imaging apparatus of the second embodiment. FIG. 10 is a flowchart showing shooting processing of the imaging apparatus of the second embodiment.

The imaging apparatus of the second embodiment differs from that of the first embodiment in the exposure control operation using the subject brightness in the shake reduction mode. As for the operations other than the exposure control operation, the imaging apparatus of the embodiment has the same structure as the imaging apparatus 1 of the aforementioned first embodiment.

In the imaging apparatus of the second embodiment, the normal, intermediate, and high sensitivity exposure control part 27 shown in FIG. 2 adopts program operating areas as shown in FIG. 9 for both the subject movement and subject brightness. In other words, when the subject brightness is low, the control part 5 performs exposure control along the high-sensitivity exposure control program line diagram (P line diagram C) shown in FIG. 7 as a high-sensitivity exposure program operating area for all of fast-moving, normal, and stationary subjects. When the subject brightness is normal or high, the control part 5 performs exposure control along the normal-sensitivity exposure control program line diagram (P line diagram A) shown in FIG. 5 for slow-moving (or stationary) subjects. Under this subject brightness condition, if the subject movement is normal, the control part 5 performs exposure control along the intermediate-sensitivity exposure control program line diagram (P line diagram B) shown in FIG. 6. On the other hand, under the above-mentioned subject brightness condition, if the subject movement is fast, the control part 5 performs exposure control along the high-sensitivity exposure control program line diagram (P line diagram C) shown in FIG. 7.

As discussed above, in the imaging apparatus of the embodiment, when the subject brightness is normal or high, exposure control is performed in the same manner as in the first embodiment. However, when the subject brightness is low, the shutter speed may become so slow that the shake compensation part 26 cannot compensate for shake. In such a case, even if the subject movement is normal or slow, subject blur may also not be reduced. Therefore, in the embodiment, when the subject brightness is low, exposure control is performed along the high-sensitivity exposure control program line diagram (P line diagram C) regardless of the subject movement, thereby limiting the slow shutter speed to reduce the shake of the imaging apparatus.

The shooting processing including exposure control in the imaging apparatus of the embodiment will be described below with reference to a flowchart of FIG. 10.

A point different from the shooting processing of the imaging apparatus 1 of the first embodiment is that a processing step S30 of checking if the subject brightness is low is inserted between a processing step S28 of checking the setting state of the shake reduction mode (corresponding to step S8 in FIG. S8) and a processing step S31 of checking if the subject movement is fast (corresponding to step S10 in FIG. 8) in the shooting processing of the imaging apparatus of the embodiment shown in FIG. 10. The other steps are the same as those shown in FIG. 8.

In the embodiment, the subject brightness information 22 is referred to in the check processing in step S30, and if it is determined that the brightness is low, the procedure jumps to step S32. Then, in step S32, the high-sensitivity exposure control program line diagram (P line diagram C) shown in FIG. 7 is set as the exposure control program line diagram. On the other hand, if it is determined that the brightness is normal or high, the procedure goes to step S31. In processing steps starting from step S31, the subject movement is checked to select an exposure control program line diagram according to the movement state in the same manner as in the first embodiment.

The imaging apparatus of the embodiment has the same effects as the imaging apparatus 1 of the first embodiment. Especially in the embodiment, when the subject brightness is low, exposure control is performed along the high-sensitivity exposure control program line diagram (P line diagram C) regardless of the subject movement, thereby reducing the effects of shakes of the imaging apparatus.

Referring next to FIGS. 11 to 16, an imaging apparatus according to a third embodiment of the present invention will be described. In the third embodiment of the present invention, when the imaging apparatus is in the shake reduction mode, the required image quality is determined based on the set shooting mode and the face size of a subject obtained by analyzing the image acquired by the image pickup device. Then, in view of the required image quality, if it is proper, pixels are mixed to increase the effective sensitivity of the image pickup device and select a relationship between the aperture value and the shutter speed suited to the increased sensitivity.

Figure 11:
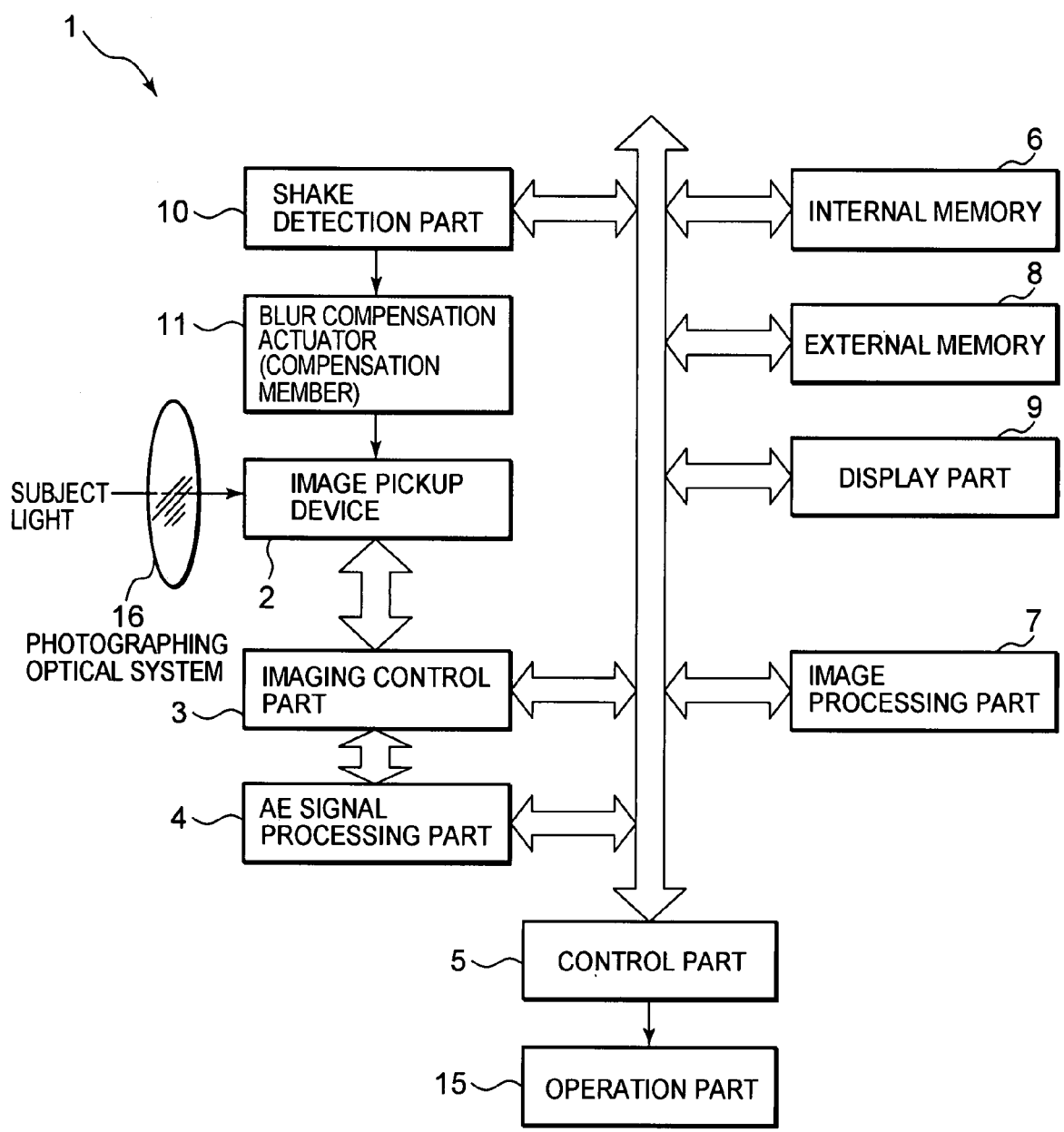
FIG. 11 is a block diagram showing the main blocks of an imaging apparatus according to a third embodiment of the present invention.

The imaging apparatus 1 of the third embodiment is an imaging apparatus with an anti-shake function such as a camera. As shown in FIG. 11, the imaging apparatus 1 of the third embodiment has many structural components common to those in the first embodiment shown in FIG. 1, except that the characteristic-point detection part 12, the specific luminance-block detection part 13, and the moving-amount calculation part 14 are not included in the third embodiment. Further, the functions of the control part 5 are partially different from those in the first embodiment. Since the other components are the same as those in the first embodiment, the description thereof is omitted. The functions of the control part 5 will be described later.

As shown in FIG. 12, the above-mentioned information, namely the shake information 21 detected by the shake detection part 10, the subject brightness information 22 detected from the captured image signal of the image pickup device 2, the shooting mode information 24 including the setting of the shake reduction mode set in response to input through the operation part 15, and the focal length information 25 on the photographing optical system 16 are captured into the information input part 20. These kinds of camera information are input into the control part 5.

The control part 5 incorporates, in addition to the imaging control part for controlling each of control elements shown in FIG. 11, a pixel mixing control part 31, an exposure sensitivity setting part 28, a sensitivity exposure control part 27, a shake compensation part 26, a face detection part 30, and an exposure control switching part 29. These parts can be implemented, for example, as program modules.

The pixel mixing control part 31 performs processing for mixing predetermined pixels on the image pickup device 2. The pixel mixing control part 31 mixes and reads a predetermined number of signals of original image data acquired by the image pickup device 2 to output the read image data as pixel-mixed image data. FIG. 13 is a diagram showing an example of a mosaic array of RGB pixels of original image data on the image pickup device 2 before pixel mixing. FIG. 14 is a diagram showing one pixel upon pixel mixing of the original data in FIG. 13.

In FIG. 14, pixel data of original image data on the image pickup device 2 are mixed for each color (R, G, B) in units of a predetermined number of pixels, for example, in units of nine pixels to output electric charge representing the sum of mixed pixel data as electric charge corresponding to one pixel, respectively. For example, nine pixels R1 in the original image data of FIG. 13 are summed up to create one pixel R1. Similarly, nine pixels G1, G2, or B1 are summed up to create one pixel G1, G2, or B1, respectively. Therefore, assuming that light incident on the image pickup device 2 is consistent, the pixel-mixed image data will have an imaging sensitivity nine times as high as that of the image data without subjected to pixel mixing. If this pixel mixing processing is performed, the exposure sensitivity can be increased. The pixels on the image pickup device 2 can be mixed in units of any natural number N other than nine. The larger the number of mixed pixels, the more the imaging sensitivity increases. Further, since pixel mixing is done by directly adding analog signals for respective pixels output from the image pickup device 2, the signal amount increases and hence the noise level becomes lower relative to the signal amount than that without subjected to pixel mixing even if both have the same luminance, thereby minimizing the degradation of image quality due to noise.

Figure 15:
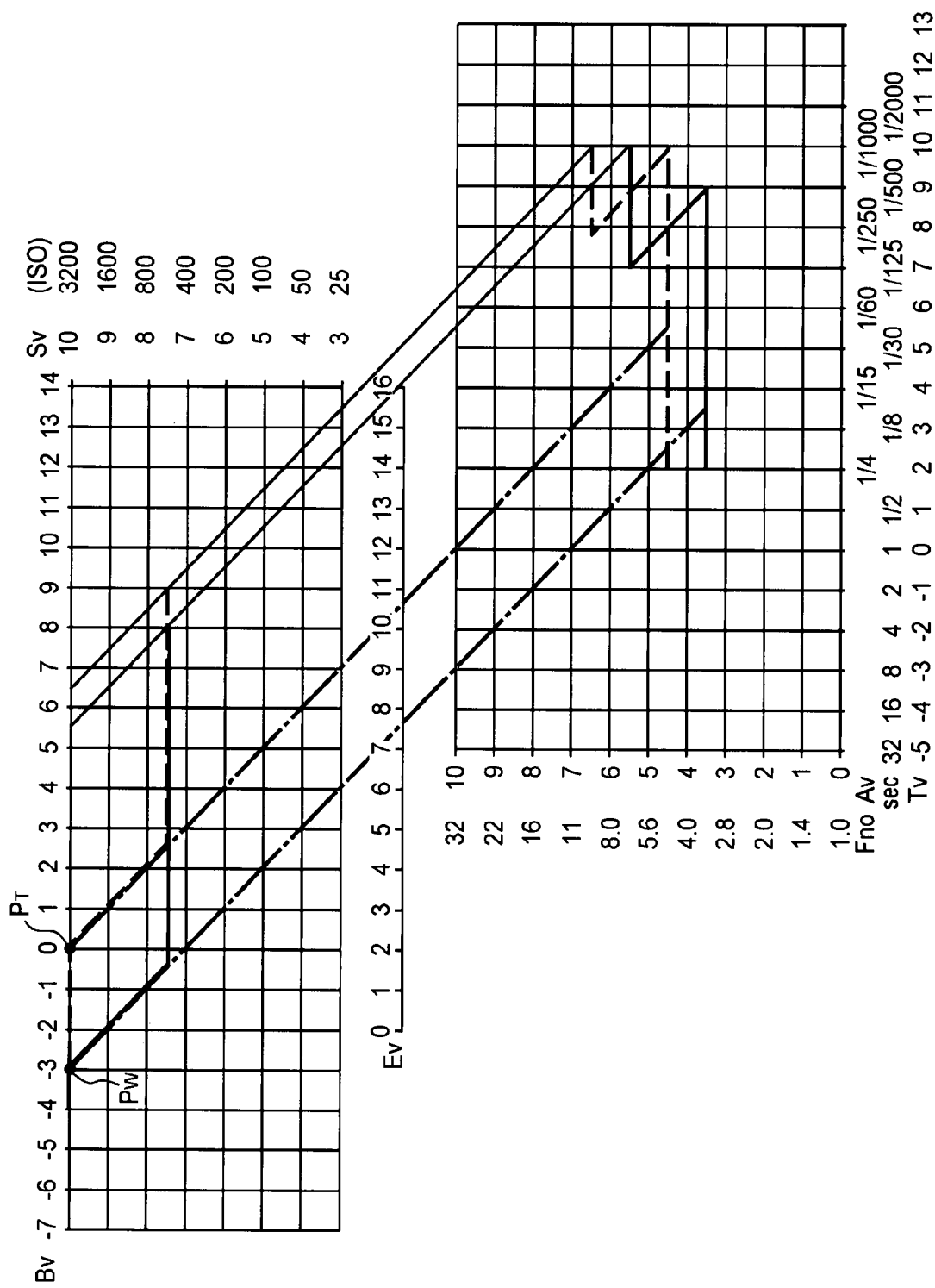
FIG. 15 shows a high-sensitivity exposure control program line diagram for wide-angle/telephoto states of the imaging apparatus of FIG. 11 in the shake reduction mode.

The exposure sensitivity setting part 28 sets the exposure sensitivity (ISO sensitivity) of the image pickup device 2 depending on the output of the pixel mixing control part 31. The sensitivity exposure control part 27 performs exposure control based on plural kinds of exposure control program line diagrams (FIGS. 4, 5, and 15).

The shake compensation part 26 controls the driving of the blur compensation actuator 11 as the compensation member in the shake reduction mode.

The face detection part 30 detects face information of a subject (person) from image data acquired by the image pickup device 2. The face detection part 30 detects characteristic points of the subject in the image data stored in the internal memory 6, and if the eyes, nose, and mouth of the person are detected, the face detection part 30 automatically detects using a known technique that a face portion of the person appears in the image data. The above example limits the detection target to the face of a person, but the present invention is not limited thereto. For example, animal eyes and the like can also be detected to perform automatic detection processing in a like manner. Based on the detection results of the face detection part 30, it can be detected from the size of the face portion whether the current shooting mode is a portrait shooting mode or a picture to be taken includes a relatively large person image even though the portrait shooting mode is not set. In such a case, it can be determined that it is desirable not to degrade image quality inferior than that of the portrait shooting mode.

The exposure control switching part 29 switches among the exposure sensitivity settings and the exposure control options. The exposure control switching part 29 determines whether to perform the above-mentioned pixel mixing processing, for example, according to the face information of the subject obtained at the face detection part 30 to change the exposure sensitivities and switch the exposure control options. In addition, if a shooting mode designating either the aperture or the shutter speed to set another is set, the pixel mixing/reading is prohibited regardless of the face information.

The following describes shake control and exposure control operations of the imaging apparatus 1 of the embodiment having the above-mentioned structure at the time of shooting with reference to FIGS. 4, 5 and 15.

FIGS. 4, 5, and 15 show exposure control program line diagrams, each indicating exposure control for each of the wide-angle/telephoto states, separately. As described in the first embodiment, FIG. 4 shows the standard exposure control program line diagram in the non-shake reduction modes, and FIG. 5 shows the normal-sensitivity exposure control program line diagram (P line diagram A) in the shake reduction mode. Further, FIG. 15 shows a high-sensitivity exposure control program line diagram (P line diagram D) using the pixel mixing processing in the shake reduction mode.

In the imaging apparatus 1, the shake information 21, the subject brightness information 22, the shooting mode information 24, and the focal length information 25, all of which are input through the information input part 20 in the above-mentioned manner described with reference to FIG. 12, are captured under the control of the control part 5 in both the shake reduction mode and non-shake reduction modes. Particularly in the shake reduction mode, shake reduction processing by the shake compensation part 26 and/or exposure control processing by the pixel mixing control part 31 and the sensitivity exposure control part 27 are performed.

First of all, if the shake reduction mode is not set (i.e., in any one of non-shake reduction modes), control of driving of the blur compensation actuator 11 is not performed through the shake compensation part 26. Then, the standard exposure control program line diagram for non-shake reduction modes shown in FIG. 4 used in the first embodiment is adopted for the wide-angle end or telephoto end (depending on the focal length information) to perform exposure control for deciding the shutter speed and the aperture value under a given shooting sensitivity.

On the other hand, if the shake reduction mode is set, the control part 5 controls the driving of the blur compensation actuator 11 through the shake compensation part 26 based on the shake information 21. Further, the exposure control switching part 29 of the control part 5 selects either the normal-sensitivity exposure control program line diagram (P line diagram A) shown in FIG. 5, or the high-sensitivity exposure control program line diagram (P line diagram D) shown in FIG. 15 using the pixel mixing processing, based on the shooting mode, the output of the face detection part 30, the subject brightness, etc. Then, according to this selection, the shooting sensitivity is switched to perform exposure control for deciding the shutter speed and the aperture value.

To be more specific, when the shooting mode set in the shake reduction mode is a special mode requiring high image quality (for example, when a landscape shooting mode, a macro shooting mode, or a portrait shooting mode is set, or when an aperture priority mode or a shutter speed priority mode is set), the pixel mixing processing is not performed regardless of the output of the face detection part 30. In this case, the normal-sensitivity exposure control program line diagram (P line diagram A) shown in FIG. 5 is selected.

In any mode other than the special modes, if the face detection part 30 detects the face of a person appearing as a relatively large area in the subject image, or when the subject brightness is equal to or more than a predetermined value, the normal-sensitivity exposure control program line diagram (P line diagram A) shown in FIG. 5 is also selected in order not to degrade the image quality.

On the other hand, when the shooting mode is not any one of the special modes and when such a face of the person appearing as a relatively large area in the subject image is not detected or when the subject brightness is less than the predetermined value, the pixel mixing processing is performed and the high-sensitivity exposure control program line diagram (P line diagram D) shown in FIG. 15 is selected.

In the high-sensitivity exposure control program line diagram (P line diagram D) shown in FIG. 15, the sensitivities for the wide-angle state (indicated by the solid line) and the telephoto state (indicated by the broken line) are increased by the pixel mixing processing to nine times the sensitivities without subjected to pixel mixing processing, respectively. Further, if the subject is in a dark light situation, each sensitivity is increased by the pixel mixing processing up to ISO 3200 in order to maintain the shake limits PW and PT, respectively. Thus, the shooting sensitivity is increased to reduce both camera shake and subject blur. Then, since the above-mentioned pixel mixing processing is performed by directly adding analog signals output from the image pickup device 2, the signal amount increases and hence the noise level becomes lower relative to the signal amount than that without subjected to pixel mixing even if both have the same luminance, thereby minimizing the degradation of image quality due to noise.

The shooting processing including exposure control in the imaging apparatus 1 will be described below with reference to a flowchart of FIG. 16.

Figure 16:
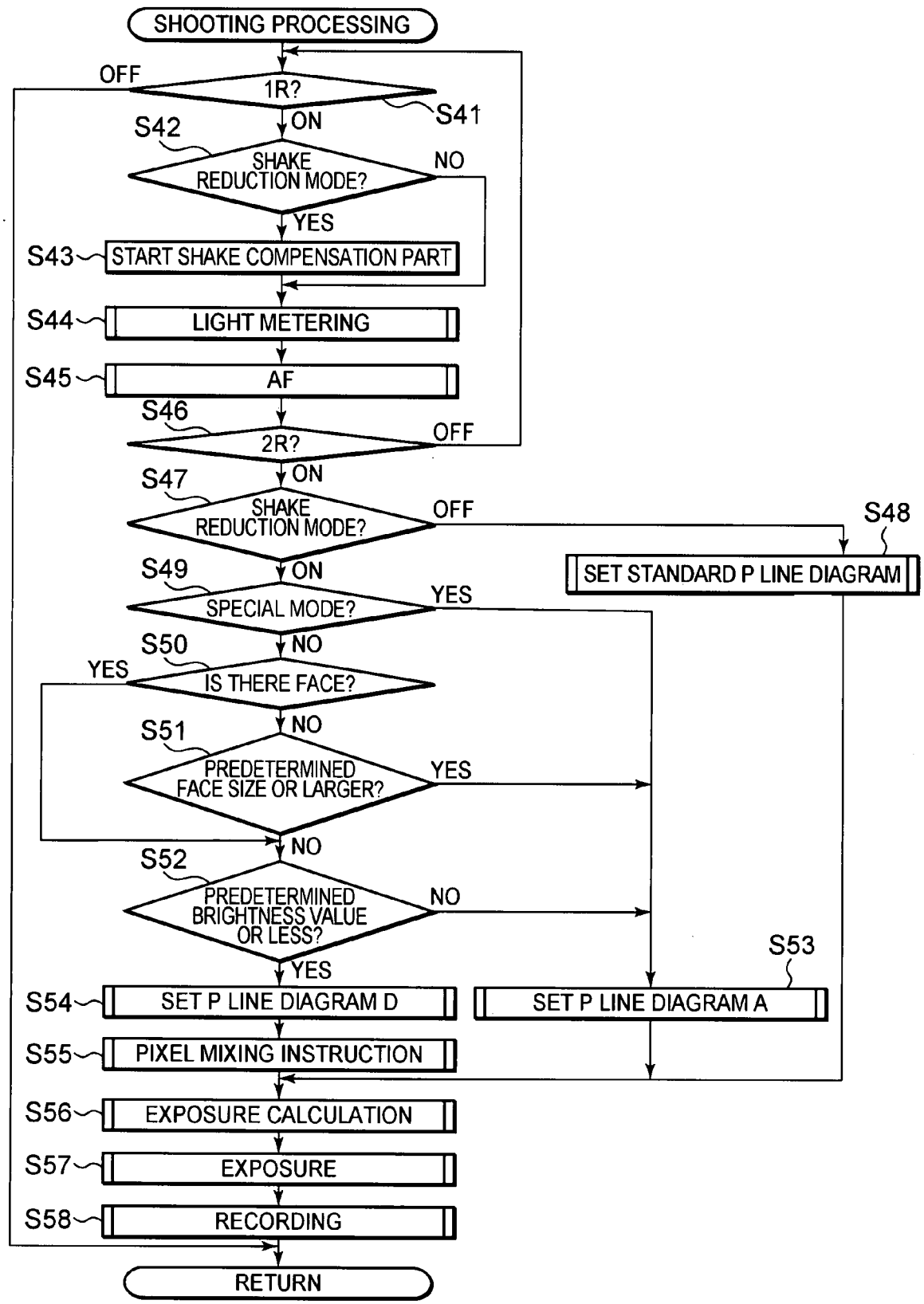
FIG. 16 is a flowchart of shooting processing in the imaging apparatus of FIG. 11.

When the shooting processing in FIG. 16 is started, the following steps are executed under the control of the control part 5. First, in step S41, the first-step release (1R) on signal is checked. If the on signal is detected, the procedure goes to step S42 to check if the shake reduction mode is set. If it is set, the amount of shake (shake information 21) detected at the shake detection part 10 is input into the control part 5 in sequence to start the operation of the shake compensation part 26 in step S43 in order to control the driving of the blur compensation actuator 11 in such a direction to compensate for the shake.

Then, in step S44, an image signal captured by the image pickup device 2 is converted at the imaging control part 3 to generate an AE signal (block-specific luminance information) at the AE signal processing part 4 from image data written in the internal memory 6 and write the AE signal to the internal memory 6. This AE signal is used upon exposure calculation to be described later. In step S45, a focus lens built in the photographing optical system 16 is driven using a known contrast technique to a position at which the subject is focused, thus performing AF.

In step S46, the second-step release (2R) on signal is checked. If the on signal is detected, the procedure goes to step S47, while if it is not detected, the procedure returns to step S41.

In step S47, it is checked again if the shake reduction mode is set. If it is not set, the procedure goes to step S48, while it is set, the procedure goes to step S49.

In step S48, the standard exposure control program line diagram (standard P line diagram) shown in FIG. 4 is set as the exposure control program line diagram, and the procedure jumps to step S56.

In step S49, it is checked if the mode set by the shooting mode information 23 is any one of special modes (for example, the shutter priority shooting mode, or the aperture priority shooting mode, or the landscape shooting mode, the macro shooting mode, or the portrait shooting mode). If the shooting mode is any one of the special modes, the procedure jumps to step S53 to increase the sensitivity not to degrade shooting image quality. On the other hand, if the shooting mode is none of the special modes, the procedure goes to step S50.

In step S50, it is checked by the face detection part 30 if there is a face image of a person in the subject image data recorded in the internal memory 6. If it is present, the procedure goes to step S51 to further check the size of the face image relative to the entire image. If the face image is equal to or larger than a predetermined size, it is determined that the degradation of image quality needs to be avoided even if the portrait shooting mode is not set, and the procedure goes to step S53. On the other hands, if there is no person's face image in the image data, or when the face image if any is a relatively small image, it is determined that image quality can be lowered to some extent, and the procedure goes to step S52.

In step S52, the subject brightness information 22 is further checked, and if the subject brightness is equal to or less than a predetermined value, the procedure goes to step S54 to instruct pixel mixing in order to increase the sensitivity. On the other hand, if it is more than the predetermined value, the procedure goes to step S53.

In step S54, the high sensitivity exposure control program line diagram shown in FIG. 15 is set as the exposure control program line diagram, and the procedure goes to S55 to instruct to perform pixel mixing processing. Thus, in this step, the sensitivity is increased by the above-mentioned pixel mixing processing according to the subject brightness.

On the other hand, in step S53, the normal-sensitivity exposure control program line diagram shown in FIG. 5 is set as the exposure control program line diagram, and the procedure goes to step S56.

In step S56, the shutter speed and the aperture value are set based on the set exposure control program line diagram, and in step S57, the exposure of the image pickup device 2 is performed.

In step S58, a picture signal created based on an image signal captured by the image pickup device 2 is once recorded in the internal memory 6, converted into a desired format (JPEG or TIFF), and recorded again in the internal memory 6. The control part 5 stores the picture signal recorded in the internal memory 6 into the external memory 8, thus completing this routine.

As mentioned above, the imaging apparatus 1 of the embodiment is the imaging apparatus with anti-shake capability to perform exposure control using both shake compensation and pixel mixing. However, in typical imaging apparatuses such as cameras, since the aperture priority mode and the shutter priority mode are manual shooting modes, there is a need to reflect camera operator's preferences. Therefore, it is not preferable that the camera side automatically increases the sensitivity. Further, in shooting modes for representing fine details or fine tones such as the landscape mode, the macro mode, the portrait mode, etc., it is also not preferable that the camera side automatically increases the sensitivity in view of noise reduction. Therefore, in the embodiment, camera shake is reduced by only using the shake compensation part without increasing the imaging sensitivity more than is necessary in the aperture priority mode, the shutter speed priority mode, the landscape mode, the macro mode, the portrait mode, etc., thereby preventing random noise or fixed-pattern noise generated upon imaging from being amplified to degrade image quality. Further, in case of night scene shooting or shooting in darkness, exposure control is performed upon imaging using both the shake compensation part and the pixel mixing processing. This can not only considerably reduce the effects of camera shake and subject blur, but also reduce noise due to an increase in sensitivity.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An imaging apparatus comprising:
   an image pickup device for capturing a subject image to acquire image data;
   a face detection part for detecting face information in the subject from the image data acquired by the image pickup device;
   an exposure sensitivity setting part for setting an exposure sensitivity of the image pickup device;
   a sensitivity exposure control part for performing exposure control in order to obtain an appropriate exposure amount for the image pickup device, having a plurality of combinations including exposure time, aperture, and exposure sensitivity upon shooting as exposure control options; and an exposure control switching part for switching the exposure sensitivities and the exposure control options according to the face information of the subject obtained by the face detection part,
wherein the exposure sensitivity setting part at least performs a setting of the exposure sensitivity through a pixel mixing and reading in which a plurality of signals from the image pickup device are mixed and read.

2. The imaging apparatus according to claim 1 further comprising an operation part for setting a shooting mode,
wherein when a shooting mode requiring the designation of either an aperture value or a shutter speed is set, the exposure control switching part performs exposure sensitivity setting to prohibit the pixel mixing and reading regardless of the face information.

3. The imaging apparatus according to claim 1 wherein the pixel mixing and reading is to mix N×N pixel signals in the pixels on the image pickup device, where N is a natural number larger than 1.

4. The imaging apparatus according to claim 1 further comprising an operation part for setting a shooting scene,
wherein when any one of landscape shooting, macro shooting, and portrait shooting is selected as the shooting scene, the exposure control switching part performs exposure sensitivity setting to prohibit the pixel mixing and reading regardless of the face information.

5. The imaging apparatus according to claim 1 wherein when a face having a size that meets a preset condition as the face information exists in the acquired image, exposure sensitivity setting is performed to prohibit the pixel mixing and reading.

6. The imaging apparatus according to claim 1 further comprising a shake compensation part,
wherein when the shake compensation part is to be operated, exposure sensitivity setting is performed to prohibit the pixel mixing and reading.

* * * * *